United States Patent [19]

Machado

[11] Patent Number: 4,758,256

[45] Date of Patent: Jul. 19, 1988

[54] AIR FILTER WITH REMOVABLE BRIDGE ASSEMBLY

[75] Inventor: Joseph Machado, Attleboro, Mass.

[73] Assignee: Allied-Signal Inc., Morristown, N.J.

[21] Appl. No.: 67,188

[22] Filed: Jun. 25, 1987

[51] Int. Cl.⁴ ............................................. B01D 46/10
[52] U.S. Cl. ...................................... 55/498; 55/480;
 55/481; 55/510; 210/493.2; 210/232
[58] Field of Search ................. 55/498, 337, 507, 509,
 55/510, 521, 502, 480, 481; 210/232, 493.2

[56] References Cited

U.S. PATENT DOCUMENTS

| | | | |
|---|---|---|---|
| 3,147,101 | 9/1964 | Phillips | 55/507 |
| 3,165,469 | 1/1965 | Bruns | 55/498 |
| 3,172,749 | 3/1965 | Harroun | 55/507 |
| 3,382,651 | 5/1968 | Hahl et al. | 55/482 |
| 3,672,130 | 6/1972 | Sullivan et al. | 55/323 |
| 4,135,899 | 1/1979 | Gauer | 55/482 |
| 4,171,963 | 10/1979 | Schuler | 55/302 |
| 4,222,755 | 9/1980 | Grotto | 55/498 |
| 4,278,455 | 7/1981 | Nardi | 55/337 |
| 4,304,580 | 12/1981 | Gehl et al. | 55/482 |
| 4,314,832 | 2/1982 | Fox | 55/482 |
| 4,460,390 | 7/1984 | Alseth | 55/332 |
| 4,482,368 | 11/1984 | Roberts | 55/480 |

FOREIGN PATENT DOCUMENTS 3536157 4/1987 Fed. Rep. of Germany ........ 55/502

Primary Examiner—Bernard Nozick
Attorney, Agent, or Firm—Ken C. Decker; William N. Antonis

[57] ABSTRACT

An air filter assembly for the air intake system of an internal combustion engine includes a housing which receives a removable, replaceable filter cartridge. The lower end of the filter housing includes a hub assembly which defines the outlet opening from the housing. A removable, replaceable bridge assembly extends into the housing from the outlet opening and provides an axial support for the filter cartridge. The bridge and hub assembly are provided with cooperating releasable retaining mechanism comprising a rib projecting into the outlet opening which engages a circumferentially extending ring on the bridge assembly to prevent the bridge assembly from being pulled into the housing. The bridge is also provided with deflectable arms which also engage the rib to prevent the bridge from being pushed out of the housing unless the arms are deflected when the bridge is to be withdrawn from the housing.

11 Claims, 1 Drawing Sheet

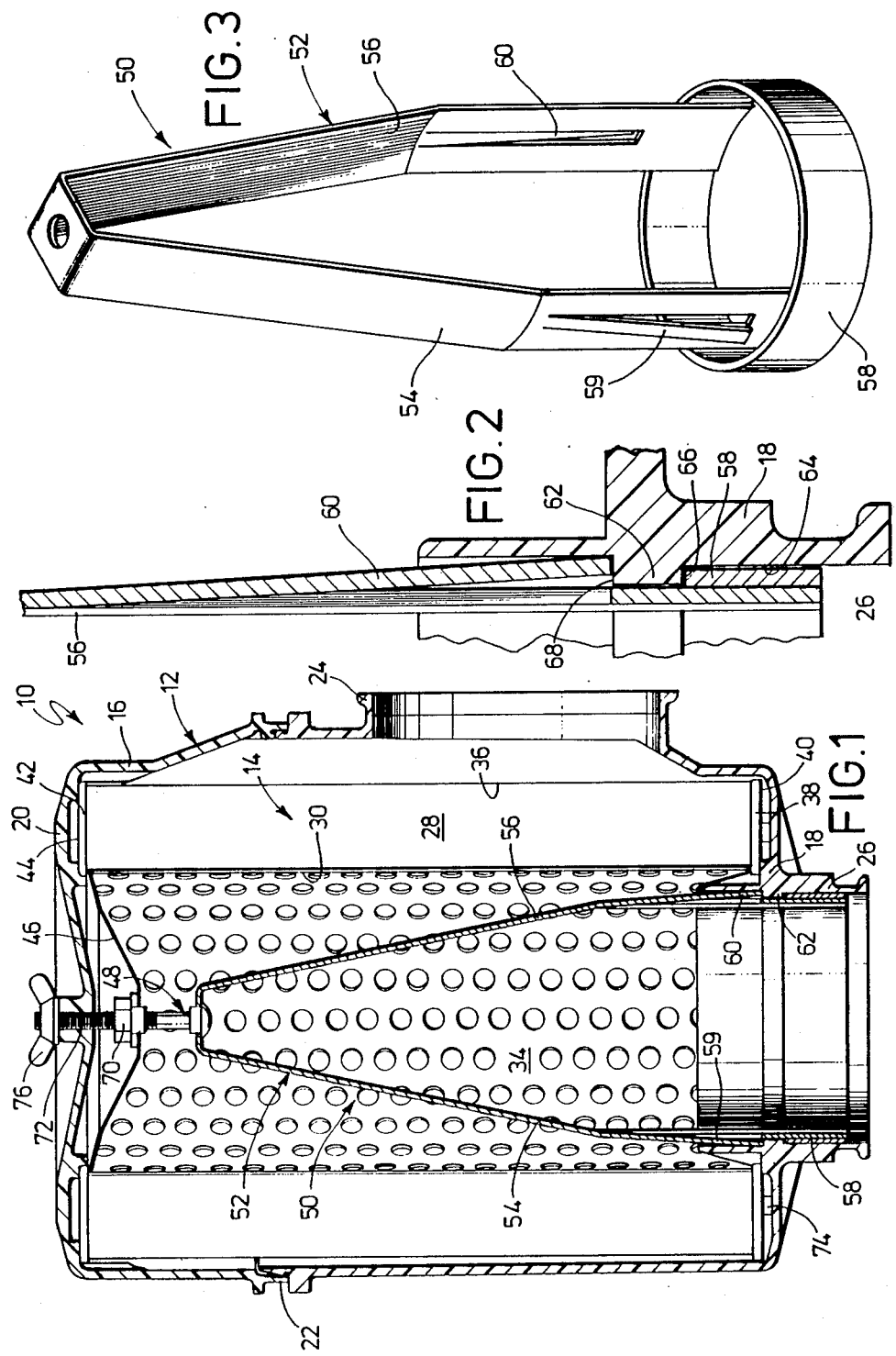

AIR FILTER WITH REMOVABLE BRIDGE ASSEMBLY

This invention relates to an air filter for filtering the inlet air of an internal combustion engine.

Inlet air filters for heavy duty engines consist of a housing (usually made out of steel) which houses a removable, replaceable filter cartridge. The filter element normally consists of a annular array of pleated paper which cooperates with the wall of the housing to define an inlet chamber and which defines an outlet chamber within the cartridge which communicates with a housing outlet in one end of the housing. Prior art air filters of this type also sometimes include a yoke or bridge assembly which is welded to the outlet opening and which projects into the outlet chamber defined within the filter cartridge. This yoke or bridge assembly provides a support or attachment for a secondary filter cartridge which acts as safety filter and which is placed within the primary filter cartridge.

The present invention relates to a releasable attachment for installing the bridge in a air filter housing. The attachment does not require any welding, etc. so that the bridge may be installed in a housing made from nonmetallic material, such as plastic. Accordingly, the bridge may be used as an attachment for the primary filter element in such a plastic housing, thereby permitting the walls of the housing to be relieved of the axial forces necessary to hold the cartridge in sealing engagement with the ends of the housing. In this way, the housing can be made out of an inexpensive plastic material. Furthermore, axial expansion of the housing, which would thereby relieve the axial force on the cartridge thereby breaking the seal between the cartridge and the end of the housing, is not a problem. Accordingly, the housing can be made out of standard plastic material instead of the more exotic and expensive plastic materials necessary to withstand the axial forces which are able to resist "creep" or axial expansion.

These and other advantages of the present invention will become apparent from the following description, with reference to the accompanying drawings, in which:

FIG. 1 is an axial cross-sectional view of an inlet air filter made pursuant to the teachings of the present invention;

FIG. 2 is an enlargement of the circumscribed portion of FIG. 1; and

FIG. 3 is an enlargement of the lower portion of the bridge used in the air filter used in FIG. 1.

Referring now to the drawings, an inlet air filter assembly is generally indicated by the numeral 10 includes a housing 12 which received a filter cartridge generally indicated by the numeral 14. The housing 12 includes a circumferentially extending side wall 16, a lower end wall or hub assembly 18, and a removable end cover 20. End cover 20 is secured to the side wall 16 through conventional fastening mechanisms generally indicied by the numeral 22. An inlet opening 24 in the side wall 16 communicates with the ambient air supply, and an outlet opening 26 communicates with the combustion air intake of the engine.

The filter cartridge 14 includes a conventional annular array of pleated paper generally indicated by the numeral 28. The pleated paper 28 is supported by an inner metallic centertube 30 which is provided with perforations 32 to permit inlet air to communicate into the outlet chamber 34. The pleated paper 28 is also supported by an outer support screen 36 which also includes perforations (not shown) to permit air to communicate from the inlet 24 into the pleated paper 28. The lower edge (viewing FIG. 1) of the pleats of the pleated paper 28 are sealed with an elasomeric sealing compound 38 which is dispensed in a metallic annular end cap 40. The annular end cap 40 permits the outlet chamber 34 to communicate with the outlet opening 26. The upper edges (viewing FIG. 1) of the pleats of the pleated paper 28 are sealed in a similar sealing compound 42 is dispensed in a trough 44 which runs circumferentially around a closed upper end cap 46. The upper end cap 46 bridges across the chamber 34 to thereby close the upper end of the annular chamber 34 to prevent the escape of air therefrom and also serves to support a fastening device or bolt generally indicated by the numeral 48, as will be hereinafter described.

A bridge assembly generally indicated by the numeral 50 projects into the chamber 34 from the hub or end wall 18. The bridge assembly 50 includes a bowed portion 52 which projects into the chamber 34 which consists of a pair of diverging legs 54, 56. A retaining ring 58 circumscribes the lower edge (viewing FIG. 1) of the legs 54 and 56, and is secured thereto, for example, by welding. The legs 54, 56 are made from a metallic, resilient material. A portion of each of the legs 54, 56 is struck out to define resilient, deflectable arms 59, 60. Because of the resiliency of the material from which the legs 54, 56 are made, the arms 59, 60 inherently diverge outwardly as illustrated, since the lowermost portions of the legs 54, 56 are restrained by the ring 58.

A circumferentially extending rib 62 projects radially inwardly from the circumferentially extending wall 64 which defines the outlet opening 26 and cooperates with the wall 64 to define an open ended recess facing out of the opening. The upper edge (viewing FIG. 1) of the ring 58 engages abutment rim 66 defined on the lower edge of the rim 62, to prevent an axial force pulling upwardly upon the bridge 50 from pulling the bridge into the chamber 34. The opposite edge of the rim 62 defines a stop surface 68 which engages the lower ends of the arms 59, 60 to prevent the bridge 50 from being forced out of the housing by an axially directed force applied downwardly (viewing FIG. 1) to the bridge 50. The fastening means 48 includes a nut 70 threadably mounted on the threaded shank 72 of the fastening means 48 and which can be tightened to load the cartridge 14 downwardly (viewing the Figure) relative to the bridge assembly 50, thereby compressing the seal 74 which circumscribes the lower end cap 40 of the cartridge 14 to assure an air tight seal between the cartridge and the housing. A wing nut 76 is also threaded on the shank 72 and holds the end cover 20 on to the side wall 16.

It will be noted that the various components of the air cleaner 10 are illustrated in the drawing in the positions which they assume when the cartridge 14 is properly installed in the housing 12. In this condition, the nut 70 can be tightened as much as necessary in order to provide an axial downwardly acting force sufficient to compress the seal 74 and thereby assure the necessary fluid tight seal between the cartridge and the housing. The bridge assembly 50 cannot be pulled upwardly due to tightening of the nut 70 because the ring 58 acts as a detent received in the recess defined between the rim 66 and the wall 64, so that upward pulling in the bridge assembly 50 will be resisted by the engagement of the ring 58 with the rim 66. Similarly, a downwardly force directed on the bridge 50 will not push the bridge from the housing, since the lower ends of the arms 59, 60 are engaged with the stop surface 68. Accordingly, it will be noted that the axial-directed forces necessary to compress the seal 74 are directed through the bridge 50, and, accordingly, the housing 12 is relieved of such axial directed forces, thereby permitting the housing to be made of a less expensive material, such as a common plastic.

If it is necessary to remove the bridge 50, the end cover 20 and cartridge 14 are removed, and a screwdriver can be inserted in the housing 12 to deflect the arms 59, 60 inwardly, thereby allowing the bridge 50 to be pushed out of the housing through the outlet opening 26. This feature is desirable, since bridges such as the bridge 50 have heretofor been mainly used to hold a safety cartridge (not shown) in metal housings which is mounted just inside the main cartridge corresponding to the cartridge 14, in a conventional air cleaner having a metal housing. The removable bridge assembly permits air cleaners to be supplied to a distribution network without the bridge assembly, and the bridge assembly can be later installed in the field only on those air cleaners in which it is necessary to install a safety cartridge.

We claim:

1. Air filter assembly comprising a housing having a side wall and a pair of opposite end walls cooperating with said side wall, said housing having an inlet opening and an outlet opening, an annular filter cartridge mounted within said housing between the inlet and outlet openings, said cartridge defining a chamber having a pair of opposite ends, one of said ends being adjacent one end wall of the housing, the other end being adjacent to other end wall of the housing, support means extending across one of said ends of the cartridge, a bridge projecting into said chamber through the other end of the latter, and fastening means attaching the bridge to the support means, said bridge and the end wall of said housing having cooperating releasable retaining means releasable securing the bridge to said other end wall, said bridge including a bowed portion projecting into said chamber, said bowed portion having a pair of legs, said releasable retaining means including detent means on said legs, said detent means engaging a recess in the other end wall of the housing, one of said openings extending through said other end wall, said one opening being defined by a circumferentially extending surface, said recess being defined on said surface, said releasable retaining means further including resilient deflectable arms projecting from each of said legs, and a stop surface on said other end wall for engagement by said arms.

2. Air filter assembly as claimed in claim 1, wherein recess defines a circumferentially extending arm forcing out of said one opening whereby upon deflection of said arms away from the stop surface the bridge may be pushed out of said housing through said one opening.

3. Air filter assembly as claimed in claim 2, wherein said detent means is a ring secured to both of said legs.

4. Air filter assembly as claimed in claim 1, wherein a circumferentially extending rib circumscribes said one opening, said rib cooperating with said surface to define said rim on one side of the rib and to define said stop surface on the other side of said rib.

5. Air filter assembly comprising a housing having a side wall and a pair of opposite end walls cooperating with said side wall, said housing having an inlet opening and an outlet opening, an annular filter cartridge mounted within said housing between the inlet and outlet openings, said cartridge defining a chamber having a pair of opposite ends, one of said ends being adjacent one end wall of the housing, the other end being adjacent to other end wall of the housing, support means extending across one of said ends of the cartridge, a bridge projecting into said chamber through the other end of the latter, and fastening means attaching the bridge to the support means, said bridge and the end wall of said housing having cooperating releasable retaining means releasable securing the bridge to said other end wall, said bridge extending through one of said openings of the housing, said releasable retaining means including a rib about said one opening, and detent means on said bridge engaging said rib, said rib facing away from said cartridge to define an open-ended recess in said one opening facing away from said rib whereby upon release of the retaining means the bridge can be pushed from the housing.

6. Air filter assembly as claimed in claim 5, wherein said releasable retaining means includes resilient deflectable arms projecting from said bridge engagement with a stop surface defined on said housing.

7. Air filter assembly as claimed in claim 6, wherein said stop surface is defined on a side of said rib opposite the side of the rib engaged by said detent means.

8. Air filter assembly as claimed in claim 7, wherein said detent means is a ring circumscribing said bridge.

9. Air filter assembly comprising a housing having a side wall and a pair of opposite end walls cooperating with said side wall, said housing having an inlet opening and an outlet opening, an annular filter cartridge mounted within said housing between the inlet and outlet openings, said cartridge defining a chamber having a pair of opposite ends, one of said ends being adjacent one end wall of the housing, the other end being adjacent to other end wall of the housing, support means extending across one of said ends of the cartridge, a bridge projecting into said chamber through the other end of the latter, and fastening means attaching the bridge to the support means, said bridge and the end wall of said housing having cooperating releasable retaining means releasable securing the bridge to said other end wall, one of said openings extending through said other end wall, said bridge including a portion extending into said one opening, said releasable retaining means releasably fastening said bridge to said one opening whereby upon release of the retaining means the bridge can be pushed from the housing through said one opening, said releasable retaining means further including resilient, deflectable arm means projecting from said bridge, and a stop surface on said housing for engagement by said arm means.

10. Air filter assembly as claimed in claim 9, wherein said stop surface circumscribes said one opening.

11. Air filter assembly as claimed in claim 9, wherein said one opening is defined by a circumferentially extending wall, said releasable retaining means including a recess in said wall engaged by a detent on said bridge.

* * * * *